(12) United States Patent
Ueno et al.

(10) Patent No.: US 12,392,864 B2
(45) Date of Patent: Aug. 19, 2025

(54) DECORATIVE MOLDED ARTICLE AND MANUFACTURING METHOD FOR SAME

(71) Applicant: NISSHA CO., LTD., Kyoto (JP)

(72) Inventors: Yusuke Ueno, Kyoto (JP); Eiji Kawashima, Kyoto (JP); Chuzo Taniguchi, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 407 days.

(21) Appl. No.: 17/917,403

(22) PCT Filed: May 20, 2021

(86) PCT No.: PCT/JP2021/019221
§ 371 (c)(1),
(2) Date: Oct. 6, 2022

(87) PCT Pub. No.: WO2021/246188
PCT Pub. Date: Dec. 9, 2021

(65) Prior Publication Data
US 2023/0152421 A1 May 18, 2023

(30) Foreign Application Priority Data
Jun. 3, 2020 (JP) .................. 2020-096735

(51) Int. Cl.
*G01S 7/02* (2006.01)
*B32B 25/08* (2006.01)
(Continued)

(52) U.S. Cl.
CPC ............ *G01S 7/028* (2021.05); *G01S 13/931* (2013.01); *B32B 25/08* (2013.01); *B32B 27/08* (2013.01);
(Continued)

(58) Field of Classification Search
CPC ..... B60R 13/005; B60R 13/04; G01S 13/931; G01S 2013/93271; G01S 7/028;
(Continued)

(56) References Cited

U.S. PATENT DOCUMENTS 7,226,187 B2    6/2007 Yamazaki et al.
10,323,817 B2 *  6/2019 Thoday .............. B60R 13/005
(Continued)

FOREIGN PATENT DOCUMENTS

| JP | 6134805 A | 5/1994 | |
| JP | H06134805 A * | 5/1994 | ......... B29C 45/1671 |
| JP | 2006117048 A * | 5/2006 | ........... B44C 5/0453 |

OTHER PUBLICATIONS

International Search Report PCT/JP2021/019221 dated Jul. 13, 2021 (pp. 1-2).

*Primary Examiner* — Peter M Bythrow
(74) *Attorney, Agent, or Firm* — Millen, White, Zelano & Branigan, P.C.; Jennifer L. King

(57) ABSTRACT

A decorative molded article transmits a radio wave handled by a wireless device and illuminates a specific portion by a light irradiated from a light emitting device. A first reflective layer is formed to have a first opening portion in a back surface of a molded body, reflects light incident from the first opening portion, and transmits the millimeter wave. A first coloring unit transmits the millimeter wave and colors the light incident from the first opening portion to generate a first colored light. A shielding layer of a decorative sheet is fixedly secured to a translucent film, transmits the millimeter wave, and shields the first colored light, and has a second opening portion arranged in the specific portion to take out the first colored light from the molded body to a front of a front surface.

20 Claims, 11 Drawing Sheets

(51) Int. Cl.
*B32B 27/08* (2006.01)
*B32B 27/18* (2006.01)
*B32B 27/30* (2006.01)
*B32B 27/36* (2006.01)
*B60R 13/00* (2006.01)
*B60R 13/04* (2006.01)
*G01S 13/931* (2020.01)

(52) U.S. Cl.
CPC .............. *B32B 27/18* (2013.01); *B32B 27/302* (2013.01); *B32B 27/308* (2013.01); *B32B 27/36* (2013.01); *B32B 27/365* (2013.01); *B32B 2255/10* (2013.01); *B32B 2255/205* (2013.01); *B32B 2255/26* (2013.01); *B32B 2255/28* (2013.01); *B32B 2274/00* (2013.01); *B32B 2307/414* (2013.01); *B32B 2451/00* (2013.01); *B60R 13/005* (2013.01); *B60R 13/04* (2013.01); *G01S 2013/93271* (2020.01)

(58) Field of Classification Search
CPC ........... H01Q 1/42; H01Q 1/422; H01Q 1/44; H01Q 1/3233; B32B 2451/00; B32B 25/08; B32B 27/08; B32B 27/18; B32B 27/302; B32B 27/308; B32B 27/36; B32B 27/365; B32B 2255/10; B32B 2255/205; B32B 2255/26; B32B 2255/28; B32B 2274/00; B32B 2307/414

See application file for complete search history.

(56) References Cited

U.S. PATENT DOCUMENTS

| | | | |
|---|---|---|---|
| 10,640,055 B1* | 5/2020 | Dellock | H01Q 1/3233 |
| 2006/0083015 A1* | 4/2006 | Yamazaki | B60R 13/00 |
| | | | 362/540 |
| 2017/0320295 A1* | 11/2017 | Fukuda | B32B 37/14 |
| 2018/0223108 A1* | 8/2018 | Hara | C09D 7/61 |
| 2019/0031118 A1* | 1/2019 | Sanahuja Clot | B60R 19/52 |
| 2019/0271458 A1* | 9/2019 | Brown | F21S 41/285 |
| 2020/0371203 A1* | 11/2020 | Hirotani | B60R 13/005 |
| 2021/0384622 A1* | 12/2021 | Caruso | B29C 45/14688 |
| 2022/0024374 A1* | 1/2022 | Studeny | B60R 13/005 |
| 2022/0123458 A1* | 4/2022 | Yanagi | B60R 13/005 |
| 2022/0163632 A1* | 5/2022 | Kobayashi | G01S 7/4047 |

* cited by examiner

DECORATIVE MOLDED ARTICLE AND MANUFACTURING METHOD FOR SAME

TECHNICAL FIELD

The present invention relates to a decorative molded article and a method for manufacturing the decorative molded article, and particularly relates to a decorative molded article that allows transmitting a radio wave and illuminating a specific portion and a method for manufacturing the same.

BACKGROUND ART

Conventionally, as described in Patent Document 1 (JP 5132656 B), for example, a decorative member referred to as an emblem is attached to a vehicle. As such a decorative member, there is a decorative molded article manufactured by injection-molding a thermoplastic member. When the emblem attached to a front portion of the vehicle is attached in front of a radar device, a radio wave with a wavelength of from 1 mm to 10 mm, which is referred to as a millimeter wave, is required to pass through the emblem.

CITATION LIST

Patent Literature

Patent Document 1: JP 5132656 B

SUMMARY OF INVENTION

Technical Problem

The decorative member of Patent Document 1 is formed of a material through which the millimeter wave transmitted and received by the radar device and visible light for decoration are allowed to pass.

However, the decorative member itself does not have a function of guiding light so as to illuminate a specific portion of the decorative member. Therefore, in Patent Document 1, a configuration in which a light emitting device of the decorative member includes a light guide plate that guides light to a specific portion and a case body having a reflecting surface, independently of the light emitting device, is employed. To provide the light guide plate and the reflecting surface, the light emitting device becomes a large scale and the decorative member and the light emitting device are expensive, and thus a space required for the decorative member and the light emitting device increases. To change a color of the transmission light, it is necessary to change a color of a light source or color a transmission portion. It is difficult to adjust a subtle tint by the light guide plate and the reflecting surface.

An object of the present invention is to provide a decorative molded article that allows easily adjusting a tint of light that illuminates a specific portion and illuminating the specific portion of the decorative molded article with a simple system.

Solution to Problem

Some aspects will be described below as means to solve the problems. These aspects can be combined randomly as necessary.

A decorative molded article according to one aspect of the present invention is a decorative molded article that transmits a radio wave handled by a wireless device that performs at least one of transmission and reception of a radio wave. The decorative molded article illuminates a specific portion by a light irradiated from a light emitting device. The decorative molded article includes a molded body, a decorative sheet, a first reflective layer, and a first coloring unit. The molded body is formed into a predetermined shape. The molded body contains a translucent polymer that allows transmitting a radio wave and transmitting the light from the light emitting device. The decorative sheet is bonded to a front surface of the molded body simultaneously with molding. The first reflective layer is formed so as to have a first opening portion in a back surface of the molded body. The first reflective layer reflects a light incident from the first opening portion and transmits a radio wave. The first coloring unit transmits a radio wave and colors the light incident from the first opening portion to generate a first colored light. The decorative sheet includes a translucent film and a shielding layer. The translucent film transmits a radio wave and a light. The shielding layer is fixedly secured to the translucent film, transmits a radio wave, and shields the first colored light. The shielding layer has a second opening portion. The second opening portion is arranged in the specific portion of the translucent film to take out the first colored light from the molded body to a front of the front surface.

Here, the radio wave refers to an electromagnetic wave generated by inverting a current in a conductor at 10 kHz to 3000 GHz.

In the decorative molded article configured in this manner, for example, the light from the light emitting device is incident from the first opening portion in the back surface of the molded body that has been molded, the light advances into the translucent polymer of the molded body, and the light is taken out from the second opening portion in the shielding layer of the decorative sheet bonded to the front surface of the molded body to the front of the front surface of the molded body. The specific portion of the decorative molded article can be illuminated by the light taken out from the second opening portion. In addition, the light reflected by the first reflective layers provided on the back surface of the molded body such that the light advances into the translucent polymer is colored by the first coloring unit and becomes the first colored light. Thus, a light guide path can be formed by the translucent polymer of the molded body, the decorative sheet, and the first reflective layers, for example, this eliminates the need for providing the light guide plate and the reflective layer separately from the decorative molded article, and the system that illuminates the decorative molded article by the light emitting device can be simplified.

In the decorative molded article described above, the decorative sheet may include a second reflective layer formed between the molded body and the shielding layer. The second reflective layer may transmit a radio wave and reflect the first colored light reflected by the first reflective layer to the first reflective layer. In the decorative molded article configured in this manner, the first colored light is reflected by the second reflective layer to the first reflective layer, and thus an amount of light of the first colored light taken out from the second opening portion can be increased.

In the decorative molded article described above, the first coloring unit is preferably provided on a front surface of the molded body. The first coloring unit is preferably a first coloring layer of the decorative sheet that is fixedly secured to the translucent film, transmits a radio wave, and colors the light incident from the first opening portion to generate the first colored light. The decorative molded article configured in this manner allows the light to be colored by the first coloring layer of the decorative sheet, and therefore the configuration of the decorative molded article can be simplified.

The decorative molded article described above may include a second coloring unit. The second coloring unit may generate a second colored light. The first reflective layer may have a third opening portion different from the first opening portion at a position where a light is guided to the second coloring unit. In the decorative sheet, the shielding layer may be arranged such that the second colored light reflected by the first reflective layer is allowed to be taken out from the second opening portion to the front of the front surface. The decorative molded article configured in this manner can selectively illuminate the specific portion with the first colored light and the second colored light and can improve designability.

In the decorative molded article described above, a smoke portion that transmits a radio wave and has a transmittance lower than a transmittance of the molded body may be arranged on the second opening portion. The decorative molded article configured in this manner can make a boundary between the second opening portion and the shielding layer be less noticeable, and can improve the appearance.

In the decorative molded article described above, the decorative sheet may include a second reflective layer formed between the molded body and the shielding layer. The second reflective layer may transmit a radio wave and reflect the first colored light reflected by the first reflective layer to the first reflective layer. The decorative sheet may be provided such that the second reflective layer blocks the second opening portion and the second reflective layer may function as a smoke portion. In the decorative molded article configured in this manner, the second reflective layer can also function as the smoke portion of the second opening portion, and the structure of the decorative molded article in which the smoke portion is arranged on the second opening portion can be simplified.

A decorative molded article according to another aspect of the present invention is a decorative molded article that illuminates a specific portion by a light irradiated from a light emitting device and includes a molded body, a decorative sheet, a first reflective layer, and a first coloring unit. The molded body is formed into a predetermined shape. The molded body contains a translucent polymer that allows transmitting the light from the light emitting device. The decorative sheet is bonded to a front surface of the molded body simultaneously with molding. The first reflective layer is formed so as to have a first opening portion in a back surface of the molded body. The first reflective layer reflects a light incident from the first opening portion. The first coloring unit colors the light incident from the first opening portion to generate a first colored light. The decorative sheet includes a translucent film and a shielding layer. The translucent film transmits a light. The shielding layer is fixedly secured to the translucent film and shields the first colored light. The shielding layer has a second opening portion. The second opening portion is arranged in the specific portion of the translucent film to take out the first colored light from the molded body to a front of the front surface.

In the decorative molded article configured in this manner, for example, the light from the light emitting device is incident from the first opening portion in the back surface of the molded body that has been molded, the light advances into the translucent polymer of the molded body, and the light is taken out from the second opening portion in the shielding layer of the decorative sheet bonded to the front surface of the molded body to the front of the front surface of the molded body. The specific portion of the decorative molded article can be illuminated by the light taken out from the second opening portion. In addition, the light reflected by the first reflective layers provided on the back surface of the molded body such that the light advances into the translucent polymer is colored by the first coloring unit and becomes the first colored light. Thus, a light guide path can be formed by the translucent polymer of the molded body, the decorative sheet, and the first reflective layers, for example, this eliminates the need for providing the light guide plate and the reflective layer separately from the decorative molded article, and the system that illuminates the decorative molded article by the light emitting device can be simplified.

A method for manufacturing a decorative molded article according to one aspect of the present invention is a method for manufacturing a decorative molded article that transmits a radio wave handled by a wireless device that performs at least one of transmission and a reception wireless device of a radio wave and illuminates a specific portion by a light emitting device. A method for manufacturing a decorative molded article includes: setting a decorative sheet in a mold and performs clamping; injecting a molten material into a cavity of the mold to mold a molded body made of a translucent polymer that allows transmitting a radio wave and transmitting a light from the light emitting device and bonding the decorative sheet on a front surface of the molded body; and forming a first reflective layer having a first opening portion in a back surface of the molded body and transmitting a radio wave. The decorative sheet includes: a translucent film, a first coloring layer, a shielding layer, and a second reflective layer. The translucent film transmits a radio wave and a light. The first coloring layer is fixedly secured to the translucent film, transmits a radio wave, and colors a light incident from the first opening portion to generate a first colored light. The shielding layer is fixedly secured to the translucent film, transmits a radio wave, and shields the first colored light. The second reflective layer is formed between the molded body and the shielding layer, transmits a radio wave, and reflects the first colored light reflected by the first reflective layer to the first reflective layer. The shielding layer has a second opening portion. The second opening portion is arranged in the specific portion of the translucent film to take out the first colored light from the molded body to a front of the front surface. In the method for manufacturing the decorative molded article described above, for example, the configuration in which the light from the light emitting device is incident from the first opening portion in the back surface of the molded body, the light advances into the translucent polymer of the molded body, and the light is taken out from the second opening portion in the shielding layer to the front of the front surface of the molded body can be manufactured by decoration simultaneously with molding using the decorative sheet bonded to the front surface of the molded body. Furthermore, the decorative molded article in which the light reflected by the first reflective layer and the second reflective layer provided on the back surface and the front surface of the molded body such that the light advances into the translucent polymer is colored by the first coloring layer and becomes the first colored light can be easily manufactured using the decorative sheet.

In the method for manufacturing the decorative molded article described above, the first reflective layer may have a third opening portion different from the first opening portion. The decorative sheet may include a second coloring layer. The second coloring layer may color a light incident from the third opening portion to generate a second colored light. The second reflective layer may be arranged such that the second colored light is reflected to the first reflective layer. The shielding layer may be configured to take out the second colored light to a front of the front surface. In the method for manufacturing the decorative molded article configured in this manner, the decorative molded article with improved designability that allows selectively illuminating the specific portion with the first colored light and the second colored light can be easily manufactured using the decorative sheet.

Advantageous Effects of Invention

The decorative molded article according to the present invention allows easily adjusting a tint of the light that illuminates the specific portion of the decorative molded article and illuminating the specific portion of the decorative molded article with a simple system. In addition, according to the method for manufacturing the decorative molded article according to the present invention, the decorative molded article according to the present invention can be easily manufactured.

DESCRIPTION OF EMBODIMENTS (1) Overall Configuration

Figure 1:
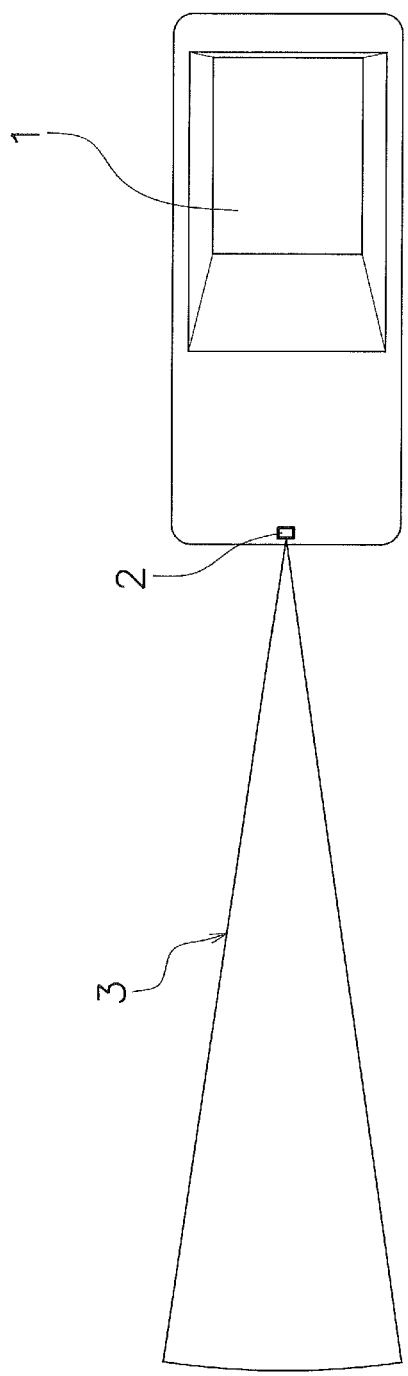
FIG. 1 is a schematic plan view of a vehicle in which a decorative molded article according to an embodiment is used.
Figure 2:
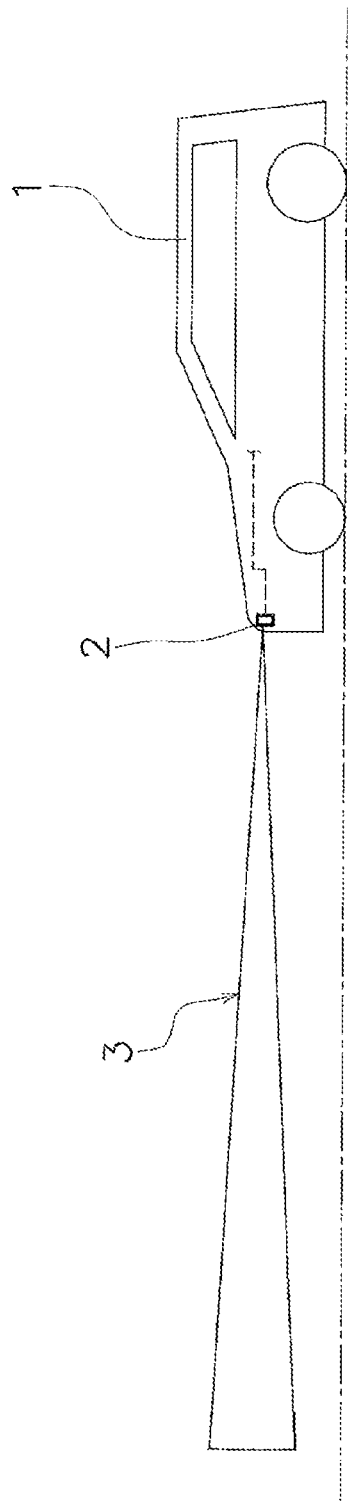
FIG. 2 is a schematic side view of a vehicle in which the decorative molded article according to an embodiment is used.

FIG. 1 and FIG. 2 schematically illustrate a vehicle 1. FIG. 1 illustrates the vehicle 1 as viewed from above, and FIG. 2 illustrates the vehicle 1 as viewed from a side surface.

A radar device 2 is attached to a front portion of the vehicle 1. The radar device 2 on the front portion of the vehicle 1 irradiates the front of the vehicle 1 with a beam 3 in a millimeter wave. The millimeter wave transmitted from the radar device 2 contacts and is reflected by a detection target in a case where there is the detection target, such as an obstacle, in front of the vehicle 1. The radar device 2 receives the millimeter wave contacting and reflected by the detection target. By transmitting and receiving the millimeter wave, the radar device 2 detects the detection target. To accurately detect the detection target, the transmission/reception of the millimeter wave by the radar device 2 is important.

Figure 3:
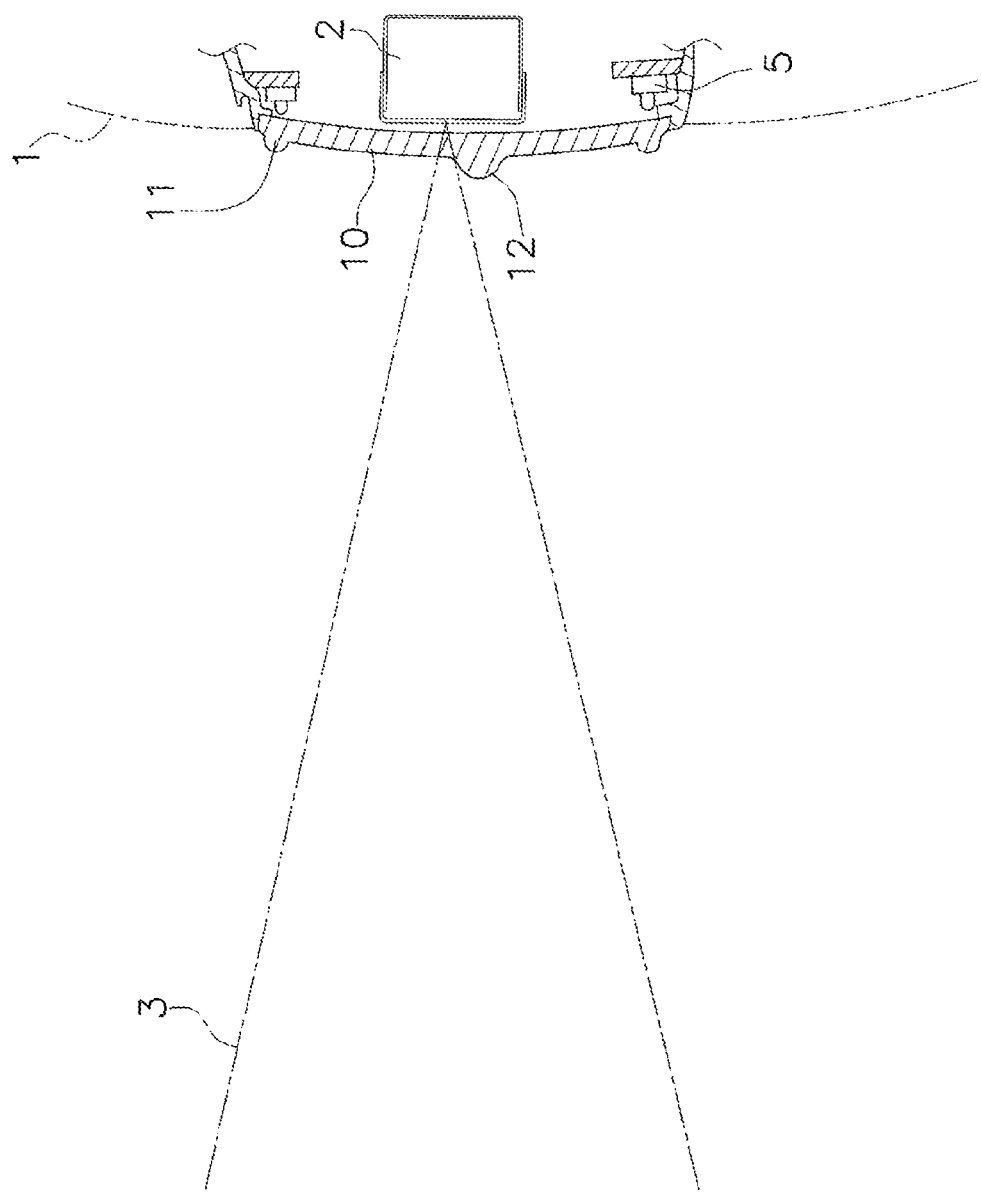
FIG. 3 is a cross-sectional view for describing an arrangement example of the decorative molded article, a radar device, and a light emitting device.

As illustrated in FIG. 3, the decorative molded article 10 is attached to the front portion of the vehicle 1 in front of the radar device 2. The decorative molded article 10 is, for example, an emblem of the vehicle 1. The radar device 2 illustrated in FIG. 3 transmits and receives the millimeter wave passing through the decorative molded article 10. In other words, the decorative molded article 10 transmits both of the transmission wave and the reception wave of the radar device 2. Here, the case where the decorative molded article 10 transmits both of the transmission wave and the reception wave is described, but the decorative molded article may transmit only one of the transmission wave or the reception wave of the millimeter wave. The decorative molded article 10 thus, for example, covers at least a portion of the radar device 2 that detects the detection target by transmission and reception of the millimeter wave and decorates the vehicle 1. The millimeter wave described in this embodiment is an example of the radio wave passing through the decorative molded article 10. The radar device 2 is an example of a wireless device that handles radio waves passing through the decorative molded article 10.

Figure 4:
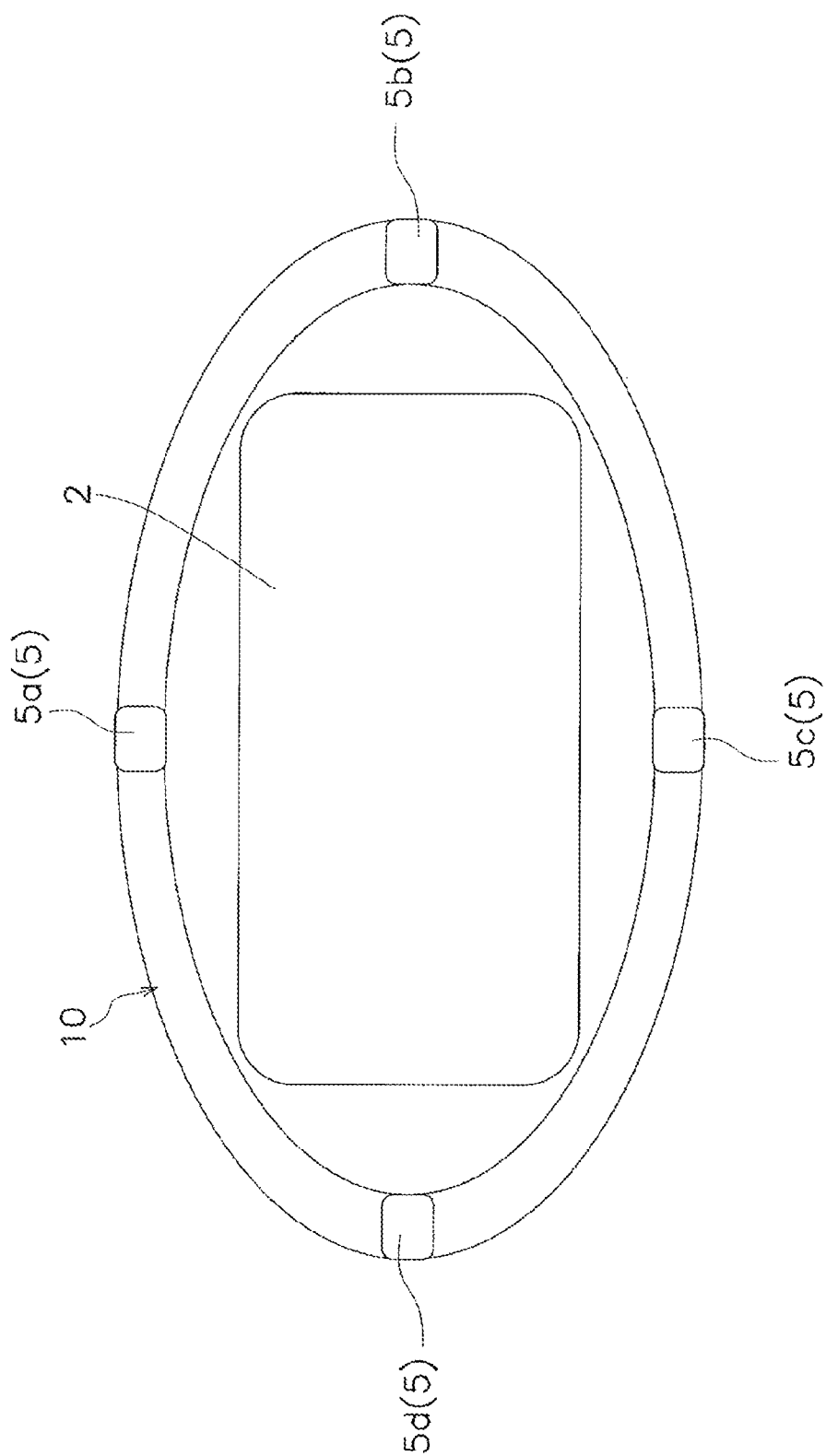
FIG. 4 is a schematic view illustrating an overview of the radar device and the light emitting device arranged on the back side of the decorative molded article.
Figure 5:
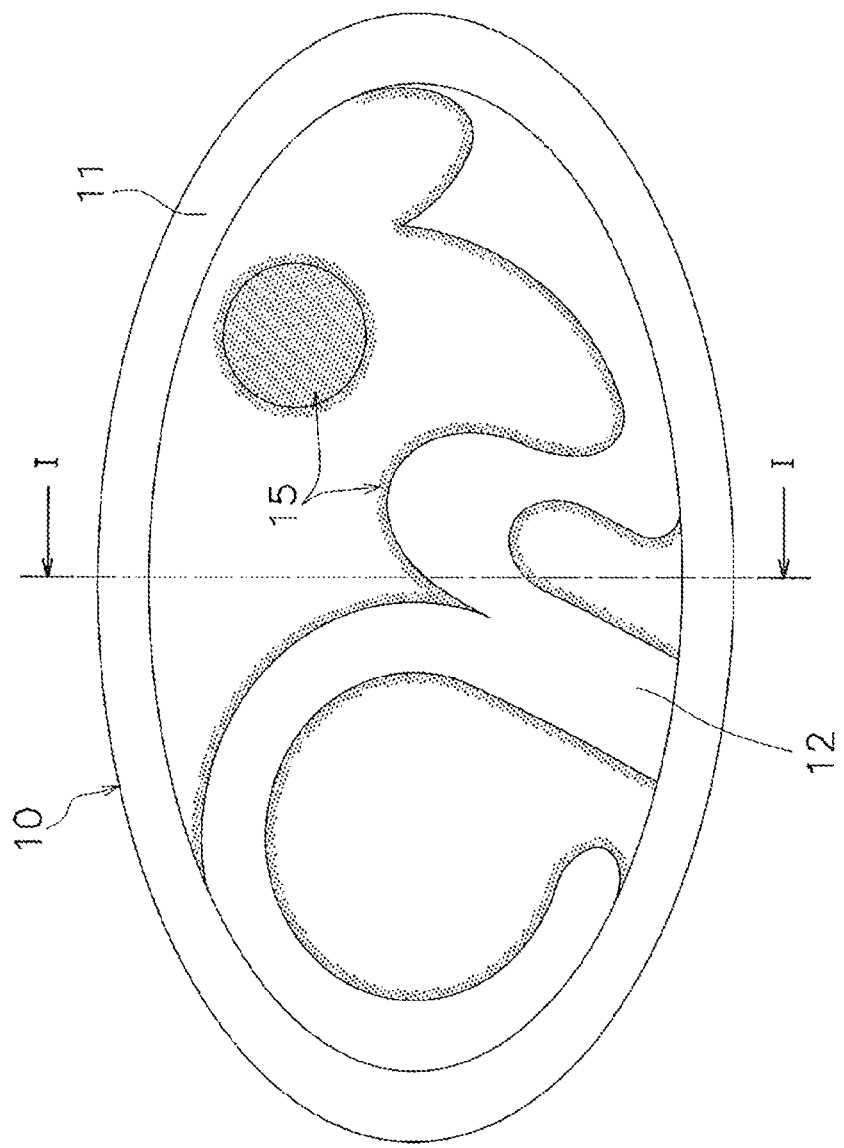
FIG. 5 is a schematic view illustrating an example of the decorative molded article according to an embodiment.

In addition, light is incident on the decorative molded article 10 from a light emitting device 5. FIG. 4 illustrates a positional relationship between the radar device 2, the light emitting device 5, and the decorative molded article 10 as viewed from the front of the vehicle 1. As illustrated in FIG. 4, the light emitting device 5 includes, for example, four LEDs 5a, 5b, 5c, and 5d. The LED is an abbreviation for Light Emitting Diode. The LEDs 5a, 5b, 5c, and 5d are arranged on the upper edge portion, the lower edge portion, the right edge portion, and the left edge portion on the back side of the decorative molded article 10. The outermost elliptical shape corresponds to the outer periphery of the decorative molded article 10. FIG. 5 illustrates an example of the shape of the decorative molded article 10 as viewed from the front of the vehicle 1. The decorative molded article 10 is drawn in an elliptical frame 11 in which the characters "ni" are illustrated. The cross-section of the decorative molded article 10 illustrated in FIG. 3 corresponds to a cross-section taken along the line I-I in FIG. 5. In the decorative molded article 10, the elliptical frame 11 and a character portion 12 "ni" are embossed in the projection shape. The decorative molded article 10 shapes the projected "ni" character shape by the predetermined shape that the molded body 20 has (see FIG. 6).

Since the vehicle 1 is also used at night, the decorative molded article 10 has a configuration in which a specific portion 15 is illuminated by the light emitting device 5. The specific portions 15 are locations indicated by hatchings of dots in FIG. 5.

(2) Detailed Configuration

Figure 6:
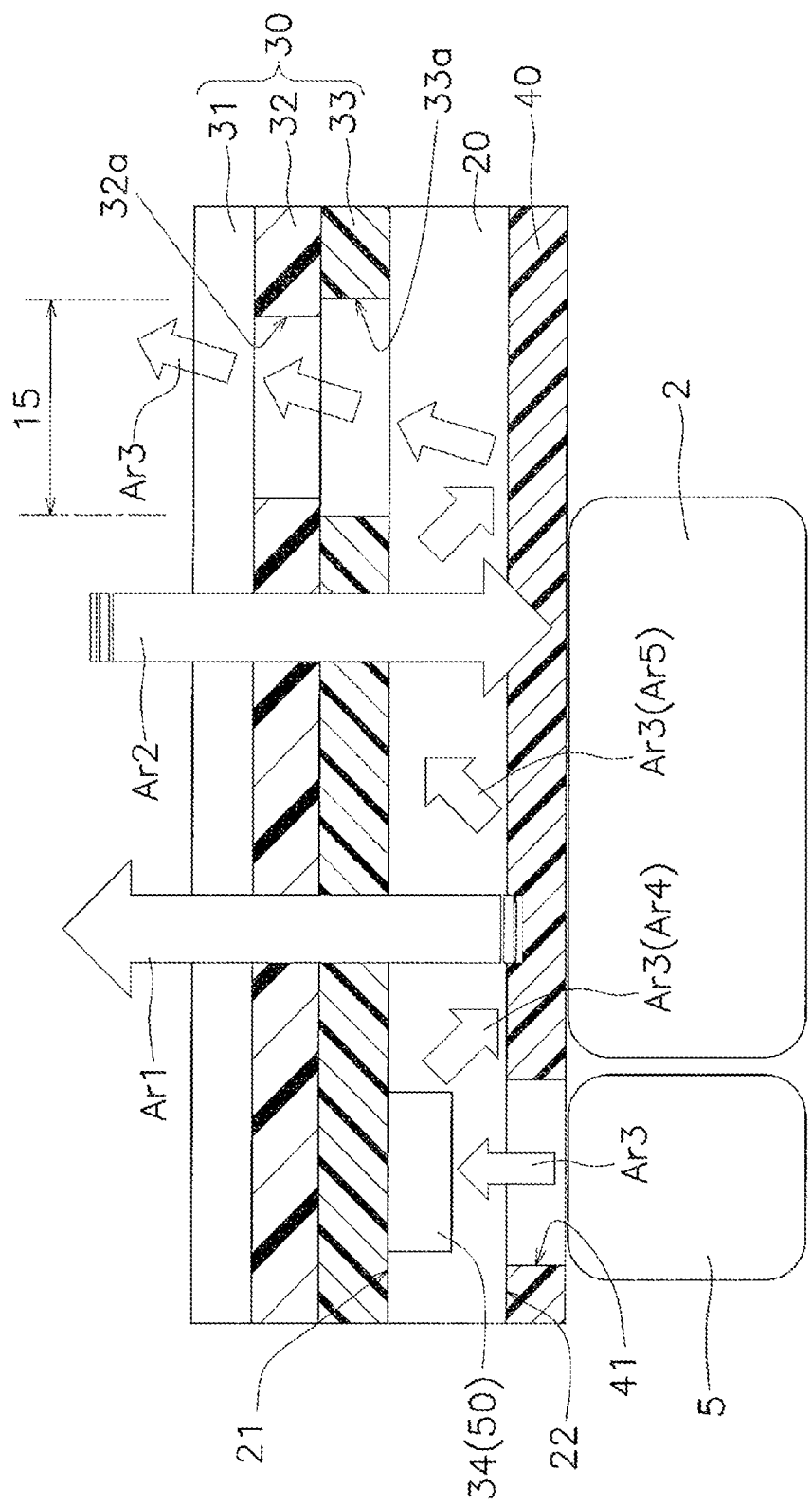
FIG. 6 is a schematic cross-sectional view illustrating a configuration of the decorative molded article according to an embodiment.

As illustrated in FIG. 6, the decorative molded article 10 includes the molded body 20, a decorative sheet 30, a first reflective layer 40, and a first coloring unit 50. In FIG. 6, an arrow Ar1 indicates the transmission wave of the millimeter wave, an arrow Ar2 indicates the reception wave of the millimeter wave, and the arrow Ar3 indicates the light irradiated from the light emitting device 5. An arrow Ar4 indicates light reflected by a second reflective layer 33, and an arrow Ar5 indicates light reflected by the first reflective layer 40.

The molded body 20 is mainly a member that determines the outer shape of the decorative molded article 10. Therefore, the molded body 20 is molded into the predetermined shape so as to provide the shape required for the decorative molded article 10. The molded body 20 is required to function to transmit the millimeter wave and function to transmit a light. The molded body 20 is a member manufactured by injection molding and is manufactured using a thermoplastic material made of a translucent polymer.

The decorative sheet 30 is bonded to a front surface 21 of the molded body 20 simultaneously with molding. The decorative sheet 30 is formed of a material that allows transmitting the millimeter wave.

The first reflective layer 40 is formed on a back surface 22 of the molded body 20. The first reflective layer 40 reflects light and transmits the millimeter wave. This first reflective layer 40 has a first opening portion 41. The first opening portion 41 is a portion where the first reflective layer 40 is not formed or when the first reflective layer 40 transmits a light due to the incident direction of the light, a portion where the light passes through the first reflective layer 40 and is guided to the molded body 20 can be regarded as the first opening portion. The case where the portion being able to be regarded as the first opening portion is a case where, for example, the first reflective layer 40 is formed by a film that reflects obliquely incident light and transmits vertically incident light.

The first coloring unit 50 transmits the millimeter wave and colors the light incident from the first opening portion 41 to generate the first colored light. The first colored light generated by the first coloring unit 50 is reflected by the first reflective layer 40 and advances into the molded body 20. The first colored light that has advanced into the molded body 20 goes through a second opening portion 32a and a fourth opening portion 33a and exits a shielding layer 32 to illuminate the specific portion 15.

The decorative sheet 30 includes a translucent film 31 that transmits a millimeter wave and a light and the shielding layer 32 that is fixedly secured to the translucent film 31, transmits the millimeter wave, and shields the first colored light. The shielding layer 32 has the second opening portion 32a arranged in the specific portion 15 of the translucent film 31. The second opening portion 32a is an opening portion for taking out the first colored light from the molded body 20 to the front of the front surface 21 of the molded body 20. For example, the second opening portions 32a are arranged at the positions of the specific portion 15 around the "ni" characters and the circular specific portion 15 illustrated in FIG. 5.

(2-1) Molded Body 20

The molded body 20 is molded by injection-molding a thermoplastic material made of a translucent polymer. The thermoplastic material constituting the molded body 20 includes, for example, a thermoplastic resin and a thermoplastic elastomer. Examples of the thermoplastic resin used for the molded body 20 include polycarbonate resin, acrylic resin, and ABS resin. When the specific portion 15 is arranged at the thermoplastic material to be illuminated, the thermoplastic material is required to transmit the millimeter wave and have translucency. Since the millimeter wave passes through the polycarbonate resin, the acrylic resin, and the ABS resin, the radar device 2 can transmit and receive the millimeter wave through the decorative molded article 10 including the molded body 20 made of these thermoplastic resins. Here, the case where the molded body 20 is made of only the translucent polymer is described. However, the molded body 20 may contain a material other than the thermoplastic material. For example, a ceramic or a glass that can transmit the millimeter wave can be insert-molded together with a translucent thermoplastic resin.

As illustrated in FIG. 6, a permeable polymer of the molded body 20 forms a light guide path that is the passage of light. The thickness of the molded body 20 of the portion to be the light guide path is preferably 1 mm or more, for example.

(2-2) Decorative Sheet 30

The decorative sheet 30 includes the second reflective layer 33. The second reflective layer 33 is formed between the molded body 20 and the shielding layer 32 and reflects the first colored light passing through the millimeter wave and reflected by the first reflective layer 40 to the first reflective layer 40. The fourth opening portion 33a is formed in the second reflective layer 33. The fourth opening portion 33a is arranged at a position overlapping with the second opening portion 32a. The first colored light reflected by the first reflective layer 40 is radiated to the front of the molded body 20 through the second opening portion 32a and the fourth opening portion 33a.

The thickness of the translucent film 31 is generally selected from a range of, for example, from 10 μm to 500 μm. The thickness of the translucent film 31 is preferably from 15 μm to 100 μm to facilitate following the three-dimensional shape of the molded body 20.

For example, resin or elastomer is used for the translucent film 31. The translucent film 31 made of resin is selected from, for example, a resin film made of a polyester resin, a polyethylene terephthalate (PET) resin, an acrylic resin, a polycarbonate resin, a polybutylene terephthalate (PBT) resin, a triacetyl cellulose resin, a styrene resin, or an ABS resin, a multilayer film made of an acrylic resin and an ABS resin, or a multilayer film made of an acrylic resin and a polycarbonate resin. As the elastomer used for the translucent film 31, for example, a thermoplastic elastomer (TPE) can be used. The thermoplastic elastomer includes, for example, amide-based TPE (TPA), ester-based TPE (TPC), olefin-based TPE (TPO), styrene-based TPE (TPS), and urethane-based TPE (TPU).

The shielding layer 32 is a layer for shielding light. The shielding layer 32 may be configured to cover the entire circumference of the decorative molded article 10. For example, in a case where the side surface of the decorative molded article 10 is covered with the shielding layer 32, the decorative sheet 30 is molded by pre-forming such that the side surface of the decorative molded article 10 is covered with the decorative sheet 30. The shielding layer 32 is formed by, for example, performing gravure printing or screen printing on the translucent film 31. The materials forming the shielding layer 32 include, for example, resin, such as an acrylic resin, a vinyl chloride vinyl acetate copolymer resin, a thermoplastic urethane resin, or a polyester resin, and a pigment or dye that is added to the resin. The pigment and the dye that do not attenuate the millimeter wave are selected.

The second reflective layer 33 is made of, for example, white ink, indium vapor deposition, tin vapor deposition, retroreflective ink, or metal ink having millimeter wave permeability. With the use of white ink, retroreflective ink, or metal ink having the millimeter wave permeability, the second reflective layer 33 is formed by, for example, gravure printing or screen printing. The indium vapor deposition and the tin vapor deposition are performed using a vacuum vapor deposition method, for example.

Although not illustrated, an adhesive layer may be provided between the second reflective layer 33 and the molded body 20, and the second reflective layer 33 may function as an adhesive layer. For example, a thermoplastic resin can be used for the adhesive layer. The thermoplastic resin used for the adhesive layer includes a urethane resin, a polyester resin, a polyamide resin, an acrylic resin, and a vinyl chloride vinyl acetate copolymer resin. The adhesive layer exhibits adhesiveness by heat of a molten resin and improves the adhesion force with the molded body 20. The thickness of the adhesive layer is, for example, from 2 μm to 20 μm in the film thickness after drying.

(2-3) First Reflective Layer 40

The first reflective layer 40 is constituted of, for example, white ink, indium vapor deposition, tin vapor deposition, retroreflective ink, a metallic film, or another ink having millimeter wave permeability. With the use of white ink, retroreflective ink, or ink having millimeter wave permeability, the first reflective layer 40 is formed by, for example, gravure printing or screen printing. The indium vapor deposition and the tin vapor deposition are performed using a vacuum vapor deposition method, for example. The metallic film includes, for example, PICASUS (registered trademark) manufactured by TORAY INDUSTRIES, INC. In the case of the metallic film, the metallic film is bonded to the molded body 20 by insert molding during molding of the molded body 20.

(2-4) First Coloring Unit 50

In the first embodiment, the first coloring unit 50 is a first coloring layer 34 of the decorative sheet 30 provided on the front surface 21 of the molded body 20. The first coloring layer 34 is fixedly secured to the translucent film 31, transmits the millimeter wave, and colors the light incident from the first opening portion 41 to generate the first colored light. It is formed on the second reflective layer 33 of the decorative sheet 30 by, for example, gravure printing or screen printing. The materials constituting the first coloring layer 34 include, for example, a resin, such as an acrylic resin, a vinyl chloride vinyl acetate copolymer resin, a thermoplastic urethane resin, or a polyester resin, and a pigment or dye that is added to the resin. The pigment and the dye that do not attenuate the millimeter wave are selected.

(3) Method for Manufacturing Decorative Molded Article 10

Figure 7:
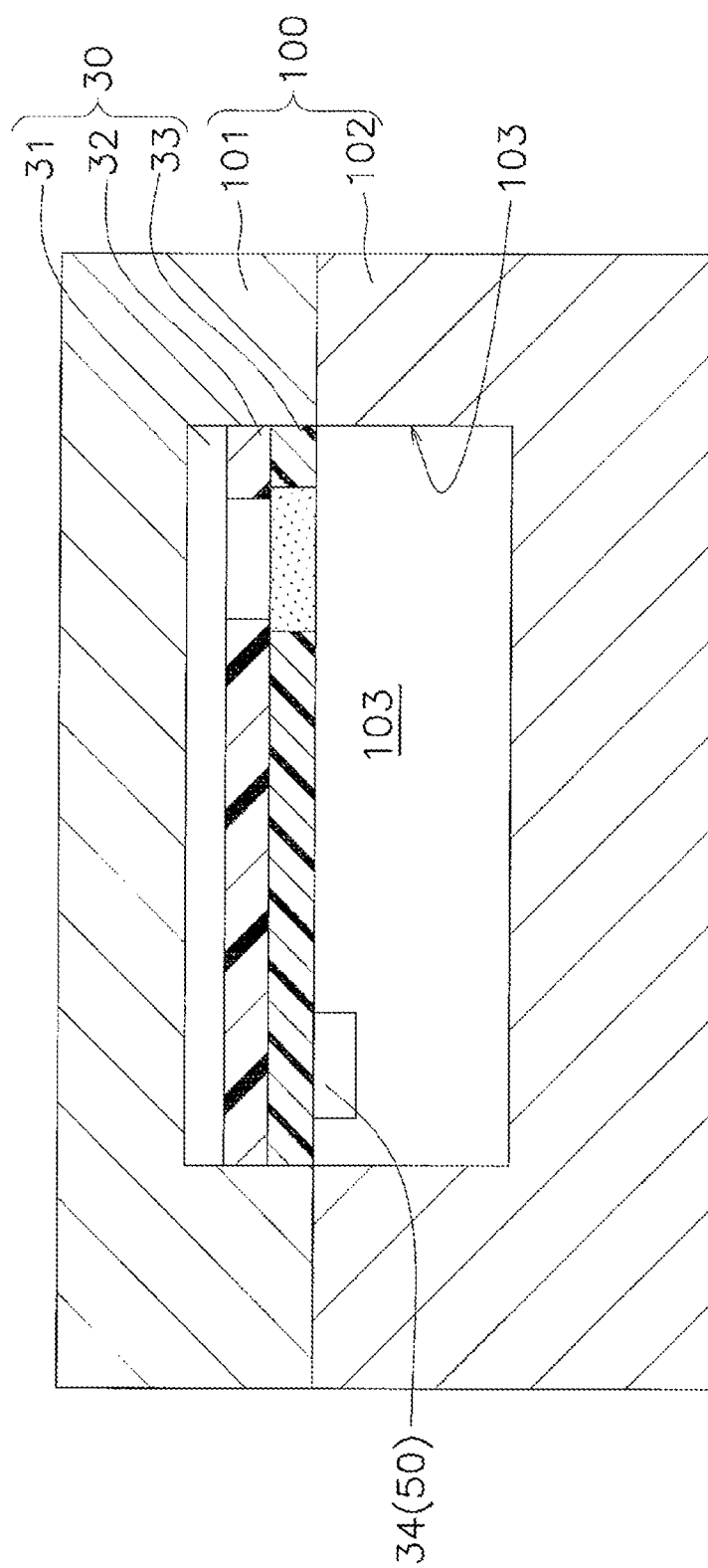
FIG. 7 is a schematic cross-sectional view for describing clamping of a manufacturing process of the decorative molded article.
Figure 8:
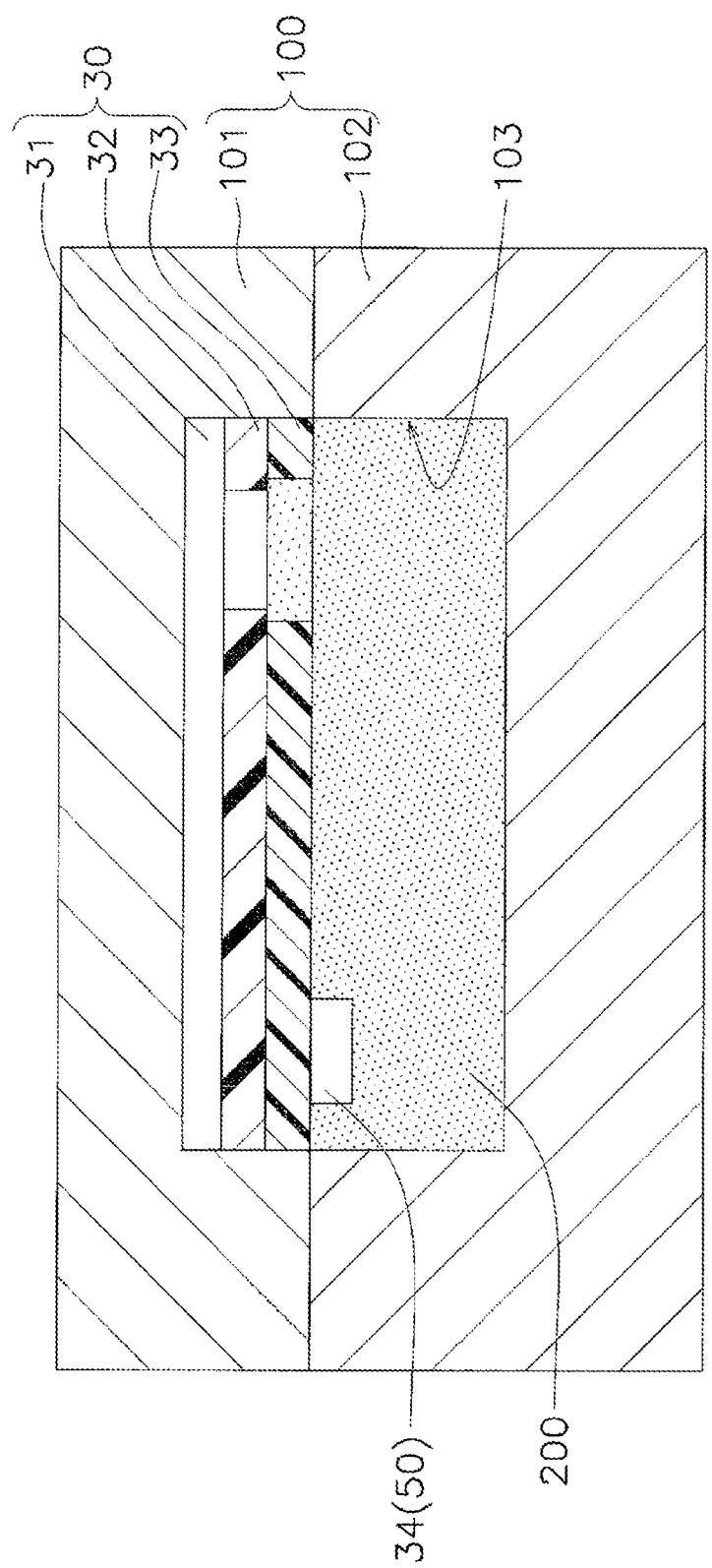
FIG. 8 is a schematic cross-sectional view for describing injection of a molten material of the manufacturing process of the decorative molded article.
Figure 9:
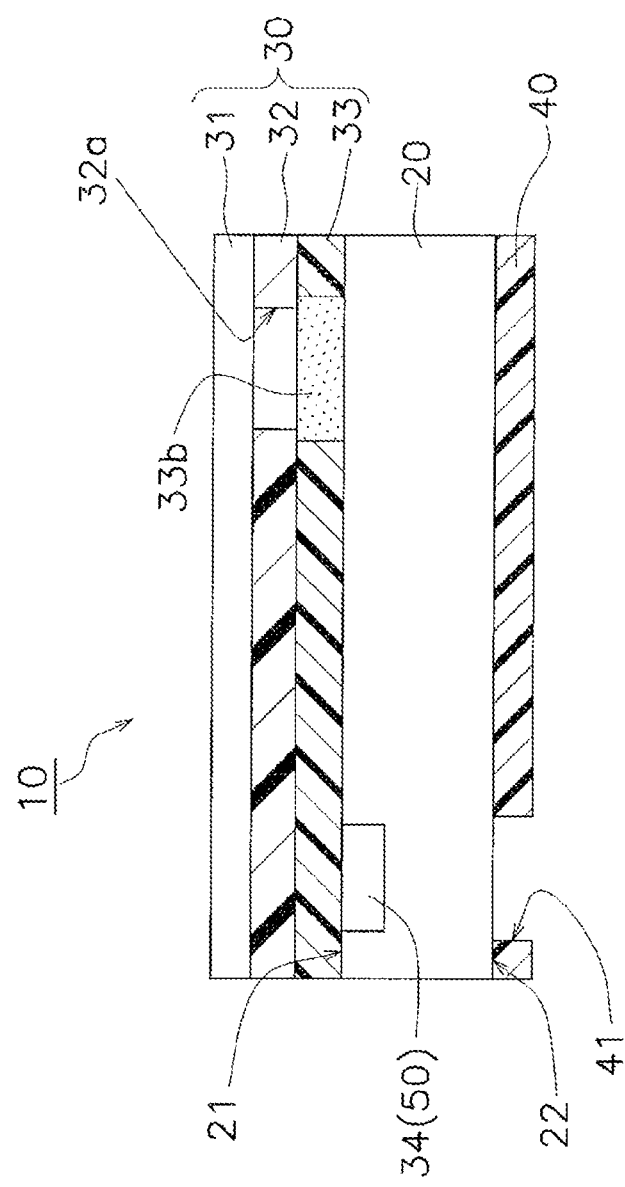
FIG. 9 is a schematic cross-sectional view for describing formation of a first reflective layer on a molded body.

The method for manufacturing the decorative molded article 10 is described using FIG. 7, FIG. 8, and FIG. 9. First, as illustrated in FIG. 7, the above-described decorative sheet 30 is set in a mold 100, and the mold 100 is clamped. The decorative sheet 30 includes the translucent film 31, the shielding layer 32, the second reflective layer 33, and the first coloring layer 34. For example, in a case where the side surface of the decorative molded article 10 is covered with the shielding layer 32, the decorative sheet 30 is molded by pre-forming before setting the decorative sheet 30 in the mold 100. A first mold 101 and a second mold 102 of the mold 100 form a cavity 103 therein in the clamped state.

As illustrated in FIG. 8, a molten material 200 is injected into the cavity 103 of the mold 100. The molten material 200 is cooled and solidified, and the molded body 20 made of a translucent polymer that can transmit the millimeter wave and transmit the light from the light emitting device 5 is formed. At this time, the decorative sheet 30 is bonded to the front surface of the molded body 20 at the same time.

As illustrated in FIG. 9, the first reflective layer 40 having the first opening portion 41 and transmitting the millimeter wave is formed on the back surface 22 of the molded body 20. The first reflective layer 40 is formed by applying white ink to the back surface 22 of the molded body 20 excluding the region of the first opening portion 41, for example, by a printing technique.

Note that when the first reflective layer 40 is formed by a metallic film, the metallic film may be set in the mold 100 before clamping, and the first reflective layer 40 may be formed by insert molding.

(4) Features 4-1

In the decorative molded article 10 of the embodiment described above, light is incident from the first opening portion 41 in the back surface 22 of the molded body 20 that has been molded, and the light from the light emitting device 5 advances into the translucent polymer of the molded body 20. The light from the light emitting device 5 is taken out from the second opening portion 32a in the shielding layer 32 of the decorative sheet 30 bonded to the front surface 21 of the molded body 20 to the front of the front surface 21 of the molded body 20. The specific portion 15 of the decorative molded article 10 can be illuminated by the light from the light emitting device 5 taken out from the second opening portion.

Furthermore, the light reflected by the first reflective layer 40 and the second reflective layer 33 provided on the back surface 22 and the front surface 21 of the molded body 20 such that the light advances into the translucent polymer are colored by the first coloring unit 50 to be the first colored light. Thus, a light guide path can be formed by the translucent polymer of the molded body 20, the decorative sheet 30, and the first reflective layer 40, for example, this eliminates the need for providing the light guide plate and the reflective layer separately from the decorative molded article, and the system that illuminates the decorative molded article 10 by the light emitting device 5 can be simplified.

4-2

In the decorative molded article 10 of the embodiment described above, the decorative sheet 30 includes the second reflective layer 33 that is formed between the molded body 20 and the shielding layer 32, transmits the millimeter wave, and reflects the first colored light reflected by the first reflective layer 40 to the first reflective layer 40. In the decorative molded article 10, the first colored light is reflected by the second reflective layer 33 to the first reflective layer 40, and thus an amount of light of the first colored light taken out from the second opening portion 32a can be increased.

4-3

In the decorative molded article 10 of the embodiment described above, the first coloring layer 34 of the decorative sheet 30 is provided on the front surface 21 of the molded body 20, is fixedly secured to the translucent film 31, transmits the millimeter wave, and colors the light incident from the first opening portion 41 to generate the first colored light. In this manner, the decorative molded article 10 is simplified such that the light can be colored by the first coloring layer 34 of the decorative sheet 30.

4-4

In the method for manufacturing the decorative molded article 10 of the embodiment described above, the configuration of the decorative molded article 10 can be achieved by decoration simultaneously with molding using the decorative sheet 30 bonded to the front surface 21 of the molded body 20.

(5) Modified Examples (5-1) Modified Example A

As illustrated in FIG. 9, in the decorative molded article 10 of the embodiment described above, a smoke portion 33b may be arranged for the second opening portion 32a. The smoke portion 33b transmits the millimeter wave and has a lower transmittance than that of the molded body 20. The decorative molded article 10 of Modified Example A can make a boundary between the second opening portion 32a and the shielding layer 32 be less noticeable with the smoke portion 33b and can improve the appearance.

(5-2) Modified Example B

In the decorative sheet 30 of the decorative molded article 10 of Modified Example A, the second reflective layer 33 may be provided so as to block the second opening portion 32a, and the second reflective layer 33 may function as a smoke portion. In the decorative molded article 10 of Modified Example B, the second reflective layer 33 can also function as the smoke portion of the second opening portion 32a, and the structure of the decorative molded article 10 in which the smoke portion is arranged on the second opening portion 32a can be simplified.

(5-3) Modified Example C

In the embodiment described above, the case where only the first colored light is guided to the same specific portion 15 has been described. However, lights having a plurality of different colors may be guided to the same specific portion 15. As in the decorative molded article 10 of Modified Example C illustrated in FIG. 10, the first colored light and a second colored light may be guided to the same specific portion 15.

Similarly to the decorative molded article 10 of the embodiment described above, the decorative molded article 10 in FIG. 10 includes the molded body 20, the decorative sheet 30, and the first reflective layer 40. The decorative molded article 10 of Modified Example C includes a second coloring unit 51 that generates the second colored light. The first coloring unit 50 is the first coloring layer 34 configured by a smoke layer arranged between the second reflective layer 33 of the decorative sheet 30 and the molded body 20.

In the first reflective layer 40, the first opening portion 41 is arranged at a position where a light is guided to the first coloring layer 34. The second coloring unit 51 is a second coloring layer 35 configured by a smoke layer arranged between the second reflective layer 33 of the decorative sheet 30 and the molded body 20. In the first reflective layer 40, a third opening portion 42 is arranged at a position where a light is guided to the second coloring layer 35. In the decorative sheet 30, the shielding layer 32 is arranged such that the second colored light reflected by the first reflective layer 40 can be taken out from the second opening portion 32a to the front of the front surface 21 of the molded body 20.

Figure 10:
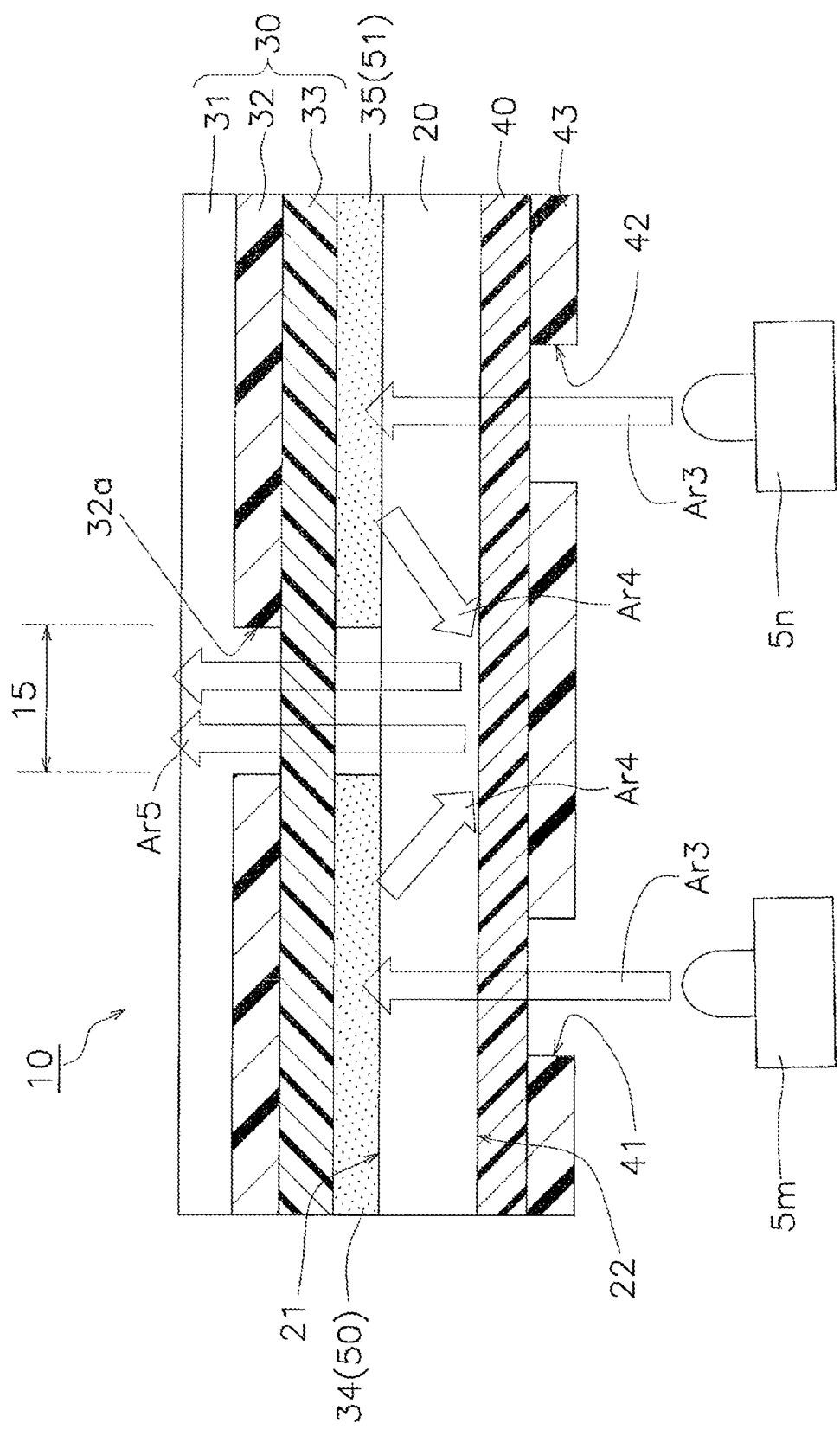
FIG. 10 is a schematic cross-sectional view illustrating an example of a configuration of a decorative molded article according to Modified Example C.

Note that in FIG. 10, the first opening portion 41 and the third opening portion 42 are provided with a shielding layer 43 in the first reflective layer 40 of a half mirror.

Here, a case where the first opening portion 41 and the third opening portion 42 are covered with the first reflective layer 40 of the half mirror is described, but the region of the first reflective layer 40 overlapping with the portions of the first opening portion 41 and the third opening portion 42 may be removed.

For example, when light emitting devices 5m and 5n are alternately turned on, the specific portions 15 of the decorative molded article 10 can be alternately illuminated with the first colored light and the second colored light different from one another.

(5-4) Modified Example D

Figure 11:
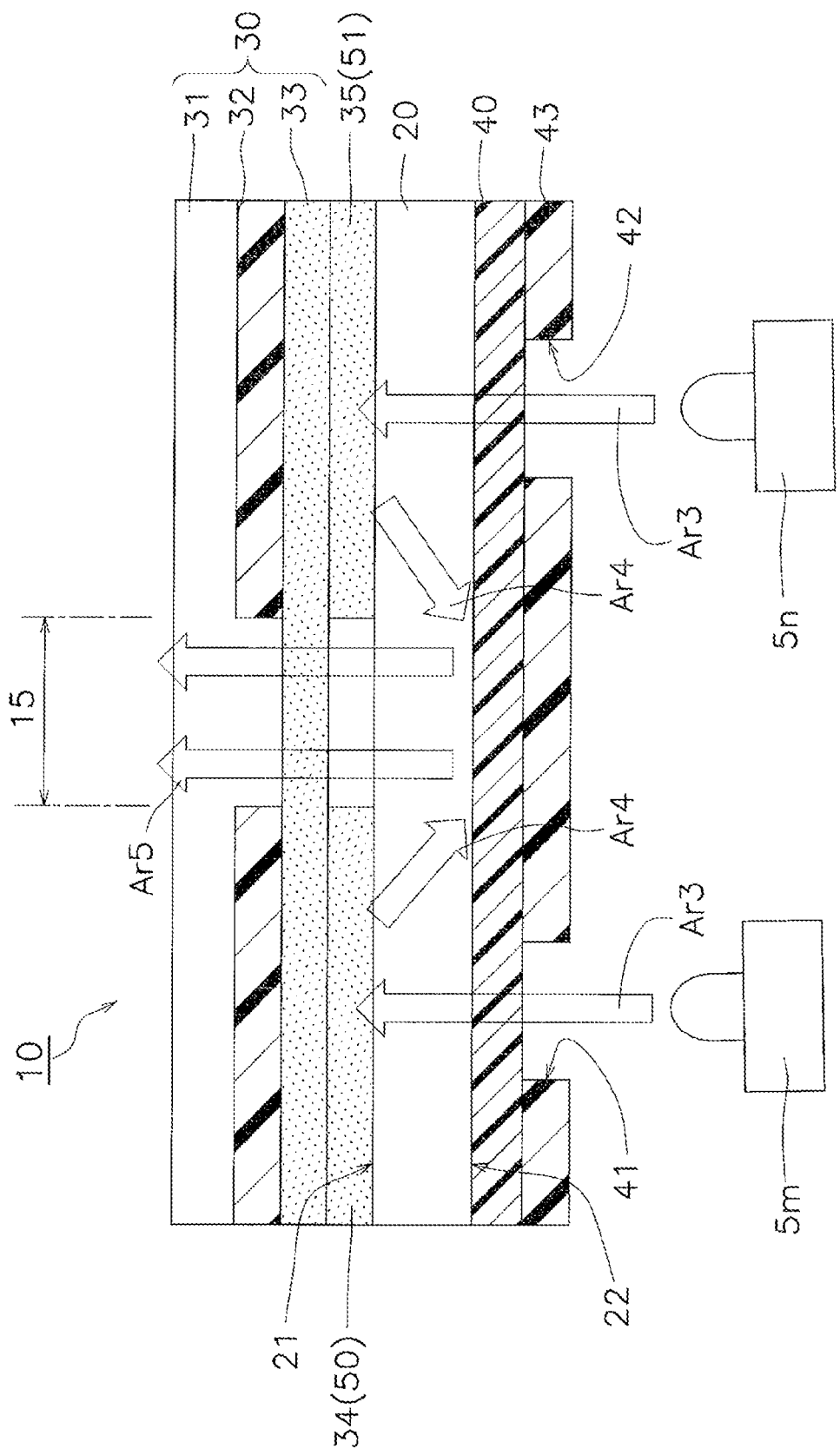
FIG. 11 is a schematic cross-sectional view illustrating an example of a configuration of a decorative molded article according to Modified Example D.

In the above-described modified example C, the case where the second reflective layer 33 is constituted by the half mirror has been described. However, the second reflective layer 33 may have another configuration. For example, in the decorative molded article 10 illustrated in FIG. 11, the second reflective layer 33 is formed by a smoke layer.

(5-5) Modified Example E

The case in which the first coloring unit 50 and the second coloring unit 51 of the embodiments and modified examples described above are the first coloring layer 34 and the second coloring layer 35 provided in the decorative sheet 30 has been described. However, the first coloring unit 50 or the second coloring unit 51 are not limited to the first coloring layer 34 or the second coloring layer 35. For example, they may be provided on the first opening portion 41 of the first reflective layer 40 or between the first reflective layer 40 and the molded body 20.

(5-6) Modified Example F

The embodiment described above has been described with an example of the millimeter wave as the radio wave that passes through the decorative molded article 10. However, the radio wave that passes through the decorative molded article is not limited to the millimeter wave. The decorative molded article according to the present invention may, for example, transmit a radio wave having a lower frequency than the millimeter wave. The decorative molded article may, for example, transmit the radio wave used when a distance between vehicles is measured using the radio wave having a frequency lower than the millimeter wave. Alternatively, the decorative molded article according to the present invention may be, for example, a radio wave in a frequency band of a submillimeter wave.

(5-7) Modified Example G

In the embodiment described above, the radar device 2 having the transmission/reception function has been described as an example of a wireless device that handles radio waves passing through the decorative molded article of the present invention. However, the wireless device that handles the radio waves passing through the decorative molded article of the present invention is not limited to the radar device having the transmission/reception function. The wireless device may have only the transmission function or only the reception function. The wireless device may be, for example, an onboard unit of an ETC system (automatic toll collection system) and a receiver having a reception antenna of a radio wave beacon.

(5-8) Modified Example H

In the embodiment described above, the case where the decorative molded article 10 covers a portion of the radar device 2 has been described. However, the decorative molded article 10 of the present invention may be installed so as not to cover a portion of the radar device 2. For example, the radar device 2 may be covered with another member, and the decorative molded article 10 may simply be arranged at the passage position of the radio wave of the radar device 2 without covering the radar device 2.

(5-9) Modified Example I

In the embodiment described above, the case where the decorative molded article 10 is arranged at the passage position of the radio wave handled by a wireless device, such as the radar device 2, and the decorative molded article 10 has the function of causing the radio wave to pass through has been described. However, the decorative molded article according to the present invention need not have the function of causing the radio wave to pass through. In the decorative molded article, the molded body 20 described above may be replaced by a molded body that does not transmit a radio wave but is molded into a predetermined shape and contains a translucent polymer that allows transmitting the light from the light emitting device 5. In the decorative molded article, the first reflective layer 40 described above may be replaced by a first reflective layer that does not transmit a radio wave but is formed so as to have the first opening portion 41 in the back surface of the molded body and reflects the light incident from the first opening portion 41. In the decorative molded article, the first coloring layer 34 may be replaced by a first coloring layer that does not transmit a radio wave, but colors the light incident from the first opening portion 41 to generate the first colored light. In the decorative molded article, the translucent film 31 of the decorative sheet 30 may be replaced by a translucent film that does not transmit a radio wave but transmits a light. Additionally, in the decorative molded article, the shielding layer 32 of the decorative sheet 30 may be replaced by a shielding layer that does not transmit a radio wave, but is fixedly secured to the translucent film and shields the first colored light.

Although one embodiment of the present invention has been described above, the present invention is not limited to the above-described embodiments, and various modifications can be made without departing from the gist of the invention. In particular, the plurality of embodiments and modified examples described herein can be combined randomly with one another as necessary.

REFERENCE SIGNS LIST

10 Decorative molded article
15 Specific portion
20 Molded body
30 Decorative sheet
31 Translucent film
32 Shielding layer
32a Second opening portion
33 Second reflective layer
33b Smoke portion
34 First coloring layer
35 Second coloring layer
40 First reflective layer
41 First opening portion
42 Third opening portion

The invention claimed is:

1. A decorative molded article that transmits a radio wave handled by a wireless device that performs at least one of transmission and reception of the radio wave, the decorative molded article illuminating a specific portion thereof by a light irradiated from a first light emitting device, the decorative molded article comprising:
    a molded body formed into a predetermined shape, the molded body containing a translucent polymer that allows transmitting of the radio wave therethrough and that allows transmitting of the light therethrough;
    a first reflective layer formed on a back surface of the molded body and having a first opening portion at a position not overlapping with the specific portion of the decorative molded article, (a) wherein the first reflective layer (i) reflects the light and (ii) transmits the radio wave therethrough, and (b) wherein the first opening portion transmits the light therethrough;
    a decorative sheet bonded to a front surface of the molded body simultaneously with molding, the decorative sheet including, from front to back (a) a translucent film that transmits the radio wave therethrough and that transmits the light therethrough; (b) a shielding layer fixedly secured to the translucent film, wherein the shielding layer (i) transmits the radio wave therethrough and does not transmit the light therethrough and (ii) has a second opening portion that transmits the light therethrough, the second opening portion at a position overlapping with the specific portion and not overlapping with the first opening portion, and (c) a second reflective layer formed between the molded body and the shielding layer, wherein the second reflective layer (i) transmits the radio wave therethrough and reflects the light and (ii) has a third opening portion, wherein the third opening portion is located at a position overlapping with the specific portion and not overlapping with the first opening portion, and the third opening portion transmits the light therethrough; and
    a first coloring unit that transmits the radio wave therethrough and colors the light to generate a first colored light; wherein
    the decorative sheet, the first reflective layer, and the molded body form a light guide path that (a) guides the light from the first opening portion to the first coloring unit, thereby producing the first colored light and (b) guides the first colored light through the third opening portion, through the second opening portion, and through the translucent film to illuminate the specific portion.

2. The decorative molded article according to claim 1, wherein
the first coloring unit is formed on the second reflective layer; and
the first coloring unit is located at a position not overlapping with the specific portion of the decorative molded article.

3. The decorative molded article according to claim 1, further comprising:
a fourth opening portion located in the first reflective layer, wherein the fourth opening portion (a) is located at a position different from the first opening portion and not overlapping the specific portion and (b) transmits the light therethrough; and
a second coloring unit that that transmits the radio wave therethrough and colors the light to generate a second colored light; wherein
the second coloring unit is located at a position not overlapping with the specific portion of the decorative molded article; and
the light guide path further (c) guides the light from the fourth opening portion to the second coloring unit, thereby producing the second colored light and (d) guides the second colored light through the third opening portion, through the second opening portion, and through the translucent film to illuminate the specific portion.

4. The decorative molded article according to claim 1, wherein
a smoke portion that transmits the radio wave therethrough and has a transmittance lower than a transmittance of the molded body is arranged on the second opening portion.

5. A decorative molded article that illuminates a specific portion thereof by a light irradiated from a light emitting device, the decorative molded article comprising:
a molded body formed into a predetermined shape, the molded body containing a translucent polymer that allows transmitting of the light therethrough;
a first reflective layer formed on a back surface of the molded body and having a first opening portion at a position not overlapping with the specific portion of the decorative molded article, (a) wherein the first reflective layer reflects the light, and (b) wherein the first opening portion transmits the light therethrough;
a decorative sheet bonded to a front surface of the molded body simultaneously with molding, the decorative sheet including, from front to back (a) a translucent film that transmits the light therethrough; (b) a shielding layer fixedly secured to the translucent film, wherein the shielding layer (i) does not transmit the light therethrough and (ii) has a second opening portion that transmits the light therethrough, the second opening portion at a position overlapping with the specific portion and not overlapping with the first opening portion, and (c) a second reflective layer formed between the molded body and the shielding layer, wherein the second reflective layer (a) reflects the light and (b) has a third opening portion, wherein the third opening portion is located at a position overlapping with the specific portion and not overlapping with the first opening portion, and the third opening portion transmits the light therethrough;
a first coloring unit that colors the light incident from the first opening portion to generate a first colored light; wherein
the decorative sheet, the first reflective layer, and the molded body form a light guide path that (a) guides the light from the first opening portion to the first coloring unit, thereby producing the first colored light and (b) guides the first colored light through the third opening portion, through the second opening portion, and through the translucent film to illuminate the specific portion.

6. A method for manufacturing a decorative molded article that transmits a radio wave handled by a wireless device that performs at least one of transmission and a reception of the radio wave and illuminates a specific portion of the decorative molded article by a light irradiated from a light emitting device, the method comprising:
setting a decorative sheet in a mold;
injecting a molten material into a cavity of the mold to mold a molded body, wherein the molded body is made of a translucent polymer that allows transmitting of the radio wave therethrough and transmitting the light therethrough;
bonding the decorative sheet on a front surface of the molded body; and
forming on a back surface of the molded body a first reflective layer having a first opening portion therein, wherein (a) the first reflective layer transmits the radio wave and reflects the light and (b) the first opening portion (i) is located at a position not overlapping with the specific portion of the decorative molded article (ii) and transmits the radio wave therethrough; wherein:
the decorative sheet includes: (a) a translucent film that transmits the radio wave and the light therethrough; (b) a shielding layer (i) that is fixedly secured to the translucent film, (ii) that transmits the radio wave therethrough, (iii) that shields the light, and (iv) that has a second opening portion, wherein the second opening portion is arranged overlapping the specific portion and transmits the light therethrough; (c) a second reflective layer that is formed between the shielding layer and the molded body, wherein the second reflective layer (i) transmits the radio wave therethrough, (ii) reflects the light, and (iii) has a third opening portion that is arranged overlapping the specific portion and that transmits the light therethrough; and (d) a first coloring layer (i) that transmits the radio wave therethrough, (ii) that colors the light to generate a first colored light, and (iii) that is arranged at a position not overlapping the specific portion; and
the decorative sheet, the first reflective layer, and the molded body form a light guide path that (a) guides the first light from the first opening portion to the first coloring layer, thereby producing the first colored light and (b) guides the first colored light through the third opening portion, through the second opening portion, and through the translucent film to illuminate the specific portion.

7. The method for manufacturing the decorative molded article according to claim 6, wherein
the first reflective layer has a fourth opening portion that is different from the first opening portion and that is located at a position not overlapping with the specific portion, and
the decorative sheet includes a second coloring layer, wherein the second coloring layer colors the light to generate a second colored light, wherein the second coloring layer is arranged at a position not overlapping the specific portion the light guide path further (c) guides the light from the fourth opening portion to the second coloring layer, thereby producing the second colored light and (d) guides the second colored light through the third opening portion and the second opening portion through the translucent film to illuminate the specific portion.

8. The decorative molded article according to claim 1, wherein the molded body is comprised of thermoplastic resin.

9. The decorative molded article according to claim 1, wherein the radio wave is a millimeter wave.

10. The decorative molded article according to claim 1, wherein the first reflective layer is comprised of at least one of white ink, indium vapor deposition, tin vapor deposition, retroreflective ink, and a metallic film.

11. The decorative molded article according to claim 5, wherein the first coloring unit is formed on the second reflective layer.

12. The decorative molded article according to claim 5, further comprising:
  a fourth opening portion located in the first reflective layer, wherein the fourth opening portion (a) is located at a position different from the first opening portion and not overlapping the specific portion and (b) transmits the light therethrough; and
  a second coloring unit that colors the light to generate a second colored light; wherein
  the light guide path further (c) guides the light from the fourth opening portion to the second coloring unit, thereby producing the second colored light and (d) guides the second colored light through the third opening portion, through the second opening portion, and through the translucent film to illuminate the specific portion of the decorative molded article.

13. The decorative molded article according to claim 5, wherein the radio wave is a millimeter wave.

14. The decorative molded article according to claim 5, wherein the first reflective layer is comprised of at least one of white ink, indium vapor deposition, tin vapor deposition, retroreflective ink, and a metallic film.

15. The method for manufacturing the decorative molded article according to claim 8, further comprising clamping the mold.

16. The method for manufacturing the decorative molded article according to claim 8, further comprising pre-forming the decorative sheet to cover side surfaces with the shielding layer.

17. The method for manufacturing the decorative molded article according to claim 8, wherein forming the first reflective layer includes applying white ink to the back surface of the molded body excluding a region of the first opening portion.

18. The decorative molded article according to claim 1, wherein the first coloring unit is provided on the first opening portion of the first reflective layer.

19. The decorative molded article according to claim 3, wherein the second coloring unit is formed on the second reflective layer.

20. The decorative molded article according to claim 3, wherein the second coloring unit is provided on the fourth opening portion of the first reflective layer.

* * * * *